(12) United States Patent
Tejima et al.

(10) Patent No.: US 7,423,812 B2
(45) Date of Patent: Sep. 9, 2008

(54) ZOOM LENS AND PROJECTOR EMPLOYING ZOOM LENS

(75) Inventors: Yasuyuki Tejima, Tokyo (JP); Etsuro Kawakami, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/888,024

(22) Filed: Jul. 31, 2007

(65) Prior Publication Data
US 2008/0030871 A1    Feb. 7, 2008

(30) Foreign Application Priority Data
Aug. 4, 2006    (JP) ............................. 2006-212677

(51) Int. Cl.
*G02B 15/14* (2006.01)
(52) U.S. Cl. .................. 359/676; 359/680; 359/683; 359/686; 359/689; 359/691; 359/684
(58) Field of Classification Search .......... 359/676–692
See application file for complete search history.

(56) References Cited
U.S. PATENT DOCUMENTS

| | | | | |
|---|---|---|---|---|
| 6,643,072 B2* | 11/2003 | Mihara | ....................... | 359/686 |
| 6,888,683 B2* | 5/2005 | Itoh | ........................... | 359/686 |
| 6,930,839 B2* | 8/2005 | Hagimori et al. | ............ | 359/684 |
| 7,304,804 B2* | 12/2007 | Hagimori et al. | ............ | 359/689 |
| 2004/0051962 A1* | 3/2004 | Mihara | ...................... | 359/686 |

FOREIGN PATENT DOCUMENTS

JP    2004-271668 A    9/2004

* cited by examiner

*Primary Examiner*—Evelyn A. Lester
(74) *Attorney, Agent, or Firm*—Frishauf, Holtz, Goodman & Chick, P.C.

(57) ABSTRACT

In a thin projector for projecting an image from a light valve such as a DMD, a compact zoom lens comprises, in order, a first lens group having a negative refractive power, a second lens group having a positive refractive power, a third lens-group having a negative refractive power, and a fourth lens group having a positive refractive power. The fourth lens group is fixed while the focal length is being changed. The first and second lens group are movable on an optical axis in a direction from the enlarging side towards the reducing side over a range from a wide angle end to an intermediate range, and are movable on the optical axis in a direction from the reducing side towards the enlarging side over a range from the intermediate range to a telephoto end. The third lens group moves on the optical axis in a direction from the reducing side to the enlarging side over a range from the wide angle end to the telephoto end, whereby the focal length of the whole lens system of the zoom lens is changed.

8 Claims, 11 Drawing Sheets

FIG. 1

IMAGE DISPLAY AREA

FIG. 2

IMAGE DISPLAY AREA

FIG. 5

FIG. 6
(EMBODIMENT 2)

FIG. 7
(EMBODIMENT 2)

FIG. 8

FIG. 9
(EMBODIMENT 3)

FIG. 10
(EMBODIMENT 3)

FIG. 11

(EMBODIMENT 3 : WIDE-ANGLE END)

(EMBODIMENT 3 : INTERMEDIATE AREA)

(EMBODIMENT 3 : TELEPHOTO END)

FIG. 12

ZOOM LENS AND PROJECTOR EMPLOYING ZOOM LENS

BACKGROUND OF THE INVENTION

The present invention relates to a compact zoom lens having a small lens aperture which projects an image from a light valve such as, mainly, a DMD (Digital Micromirror Device), in which an image is formed by changing reflecting directions of light shone thereon, on to a screen or the like on an enlarged scale.

Adopting a DMD on a projector unit as a light valve is regarded as advantageous over other methods in obtaining miniaturized projector units. Currently, portable compact projector units have been broadly propagated, and among them, data projectors constitute a center of interest because of its handiness when presenting information. In projector units designed to be portable, it is critical to reduce the thickness of a projector unit, and hence, it can be said that the reduction in thicknesses a most critical factor in projector units which are in many cases carried together with a note-type personal computer for use in combination therewith. As an example of a means for solving this problem, for example, the Japanese Unexamined Patent Publication No. 2004-271668 discloses, a design method for making compact a projection lens.

An aspect of the invention is to provide a projector unit which is thin enough to be carried conveniently and which can project an enlarged image with high image quality on to a large screen even within a limited space by realizing a compact zoom lens.

SUMMARY OF THE INVENTION

According to a preferred aspect of the invention, there is provided a zoom lens including an optical system made up of a plurality of lens elements or a plurality of lens groups, wherein the following conditional expression (1) is satisfied with respect to a maximum effective aperture and a size of an image circle, and the following conditional expressions (2), (3) are satisfied with respect to an angle of view and brightness, respectively:

$$1.00 < \phi L/\phi I < 1.60 \quad (1)$$

$$55 < BW < 70 \quad (2)$$

$$1.8 < FN < 2.9 \quad (3)$$

where,

φL: maximum effective aperture of a lens system;

φI: diameter of a minimum-sized circle which encapsulates a whole image display unit on a reducing side image plane about an optical axis;

BW: total angle of view relative to an image point with φI (focused to an object distance of 1700 mm from an enlarging side first surface when a focusing operation is available, at a wide-angle end in the case of a zoom lens);

FN: full-aperture F value of a whole lens system (focused to the object distance of 1700 mm from the enlarging side first surface when the focusing operation is available, at a minimum value in the case of the zoom lens).

In addition, according to another preferred aspect of the invention, there is provided a projector in which the zoom lens is installed.

DESCRIPTION OF THE PREFERRED EMBODIMENTS

Hereinafter, the present invention will be described based on specific numerical embodiments thereof. In addition, a lens element having a positive refractive power is represented as a positive lens element, while a lens element having a negative refractive power is represented as a negative lens element.

Figure 1:
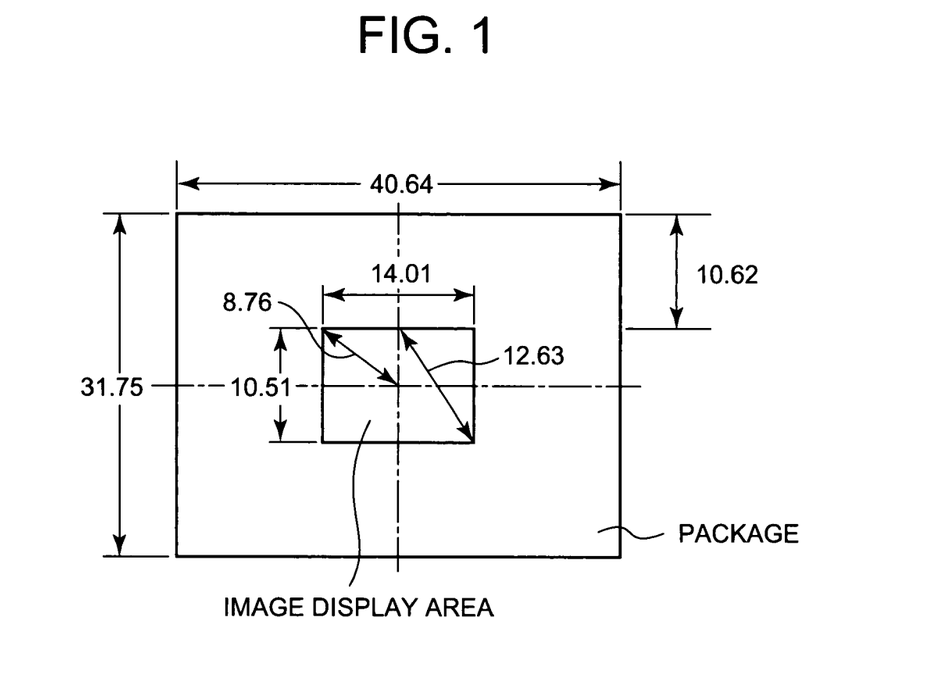
FIG. 1 is a dimensions diagram of a 0.7-inch image display device.
Figure 3:
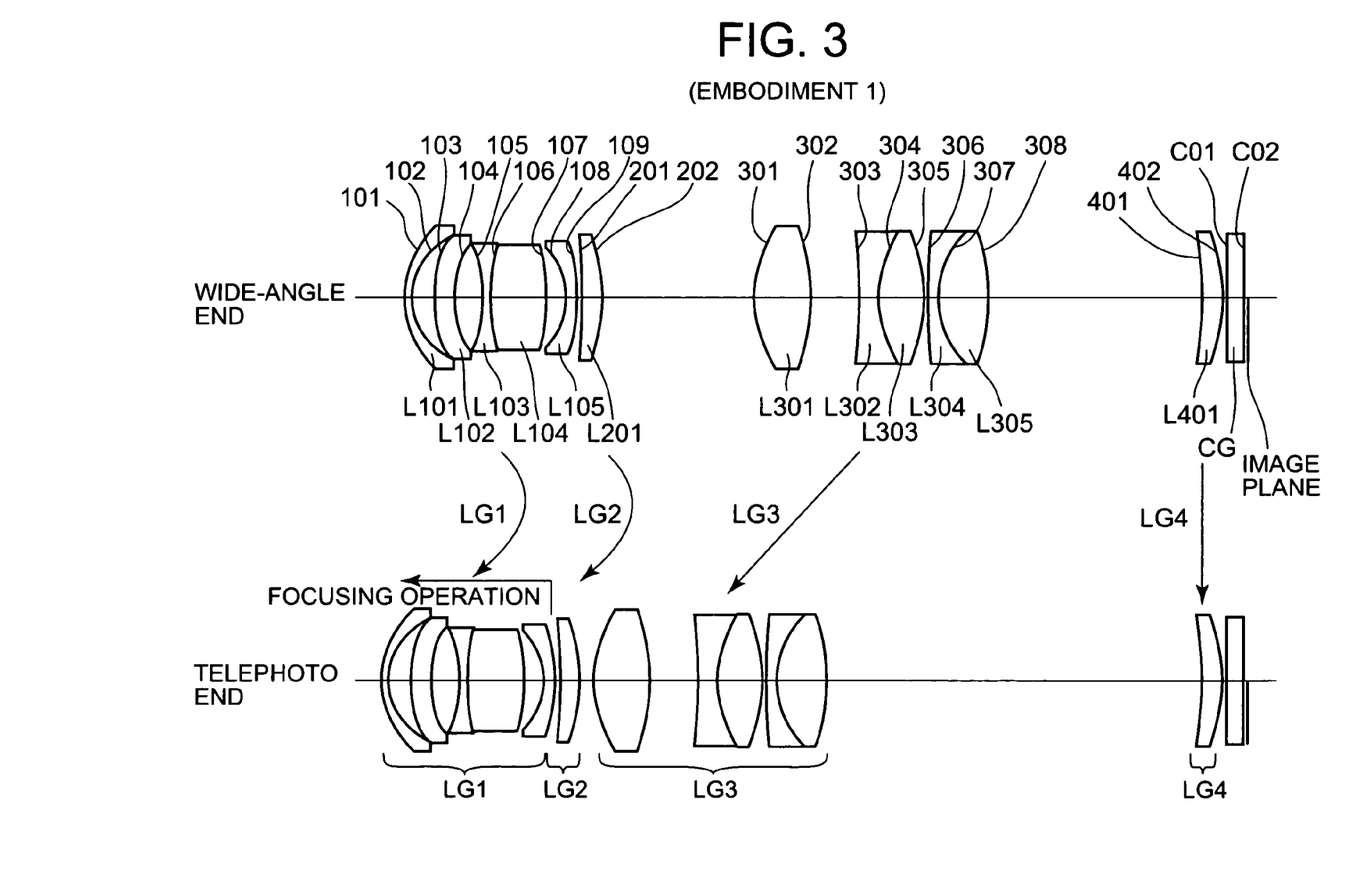
FIG. 3 is a diagram showing a lens configuration of a first embodiment of a zoom lens according to the invention.
Figure 4:
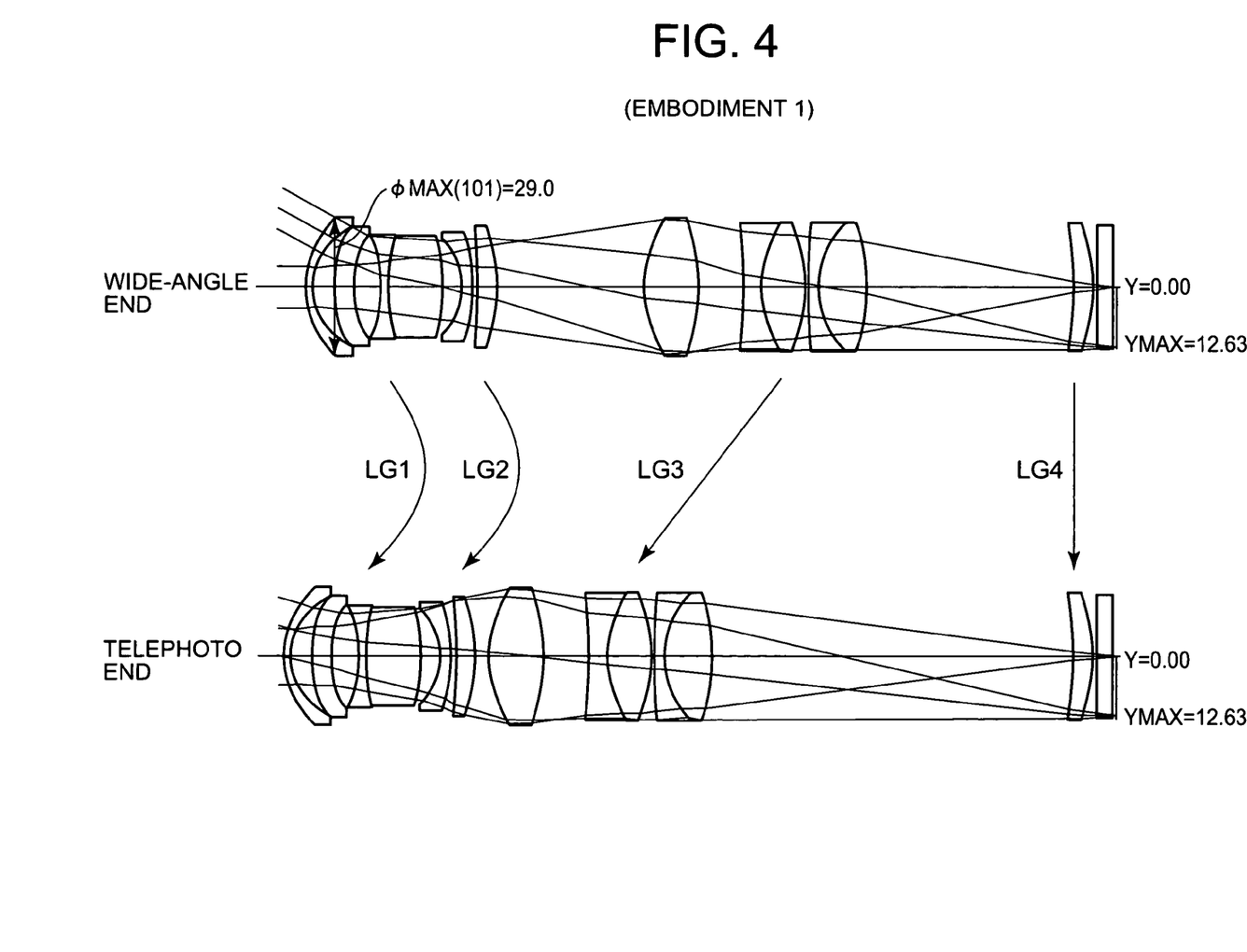
FIG. 4 is a diagram showing optical paths and lens effective apertures of the first embodiment.

A zoom lens of a first embodiment shown in FIGS. 3 and 4 is a compact projection zoom lens which is best suited to an application in which a 0.7-inch DMD image display device shown in FIG. 1 is used. This zoom lens has a maximum effective aperture of 29.0 mm as the projection lens and is made up of, in order from an enlarging size thereof, a first lens group LG1 having a negative refractive power as a whole, a second lens group LG2 having a positive refractive power as a whole, a third lens group. LG3 having a negative refractive power as a whole, and a fourth lens group LG4 having a positive refractive power as a whole.

The first lens group LG1 is made up by disposing, in order from an enlarging side thereof, a negative lens element (designated as L101 and having an enlarging side surface 101 and a reducing side surface 102) which is formed into a meniscus shape which is made to bulge outwards from the enlarging side to be convex, a negative lens element (designated as L102 and having an enlarging side surface 103 and a reducing side surface 104) which is made to bulge outwards from the enlarging side to be convex, a negative lens element (designated as L103 and having an enlarging side surface 105 and a reducing side surface 106), a positive lens element (designated as L104 and having an enlarging side surface 106 and a reducing side surface 107, cemented to L103), and a negative lens element (designated as L105 and having an enlarging side surface 108 and a reducing side, surface 109).

The second lens group LG2, which follows the first lens group LG1, is made up by disposing a single positive lens element (designated as L201, and having an enlarging side surface 201 and a reducing side surface 202).

The third lens group LG3 is made up by disposing a positive lens element (designated as L301, and having an enlarging side surface 301 and a reducing side surface 302), a negative lens element (designated as L302, and having an enlarging size surface 303 and a reducing side surface 304), a positive lens element (designated as L303, having an enlarging side surface 304 and a reducing side surface 305, and cemented to L302), a negative lens element (designated as L304, and having an enlarging side surface 306 and a reducing side surface 307), and a positive lens element (designated as L305, having an enlarging side surface 307 and a reducing side surface 308, and cemented to L304).

The fourth lens group LG4 is made up by disposing a single positive lens element (designated as L401, and having an enlarging side surface 401 and a reducing side surface 402). In addition, a cover glass CG (having an enlarging side surface designated as C01 and a reducing side surface as C02), which is a constituent components of a light valve such as a DMD, is provided between a reducing side of the fourth lens group LG4 and a surface of the light valve with a slight airspace provided therebetween.

In addition, the fourth lens group LG4 is fixed while the focal length is being changed, the first lens group LG1 and the second lens group LG2 are made to move on an optical axis in a direction from the enlarging side towards the reducing side over a range from a wide angle end to an intermediate range and are made to move on the optical axis in a direction from the reducing side towards the enlarging side over a range from the intermediate range to a telephoto end, and the third lens group LG3 is made to move on the optical axis in a direction from the reducing side to the enlarging side over a range from the wide angle end to the telephoto end, whereby the focal length of the whole lens system of the zoom lens is changed.

Figure 2:
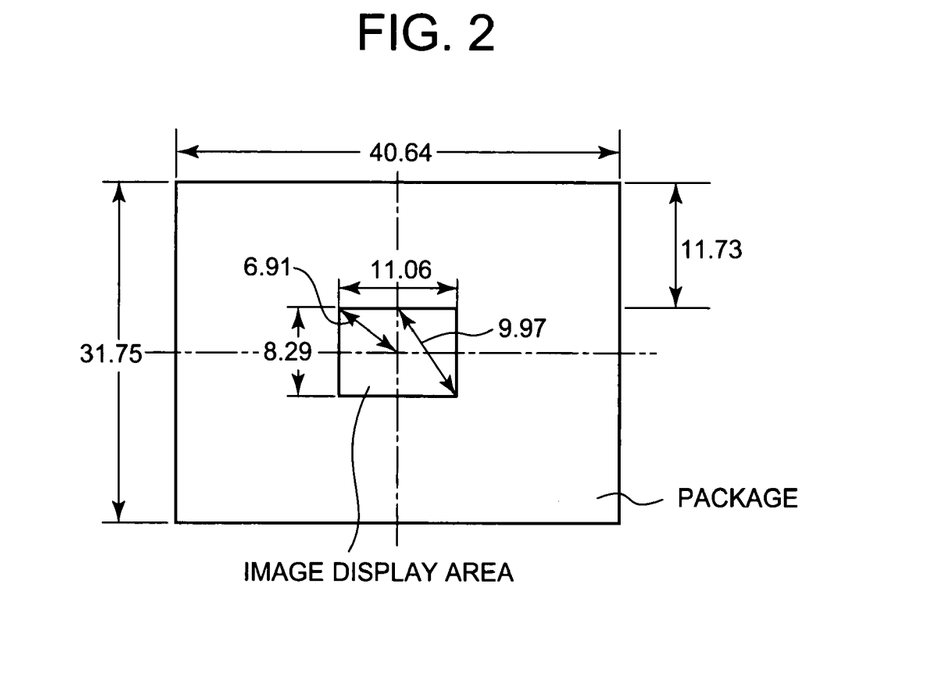
FIG. 2 is a dimensions diagram of a 0.55-inch image display device.
Figure 6:
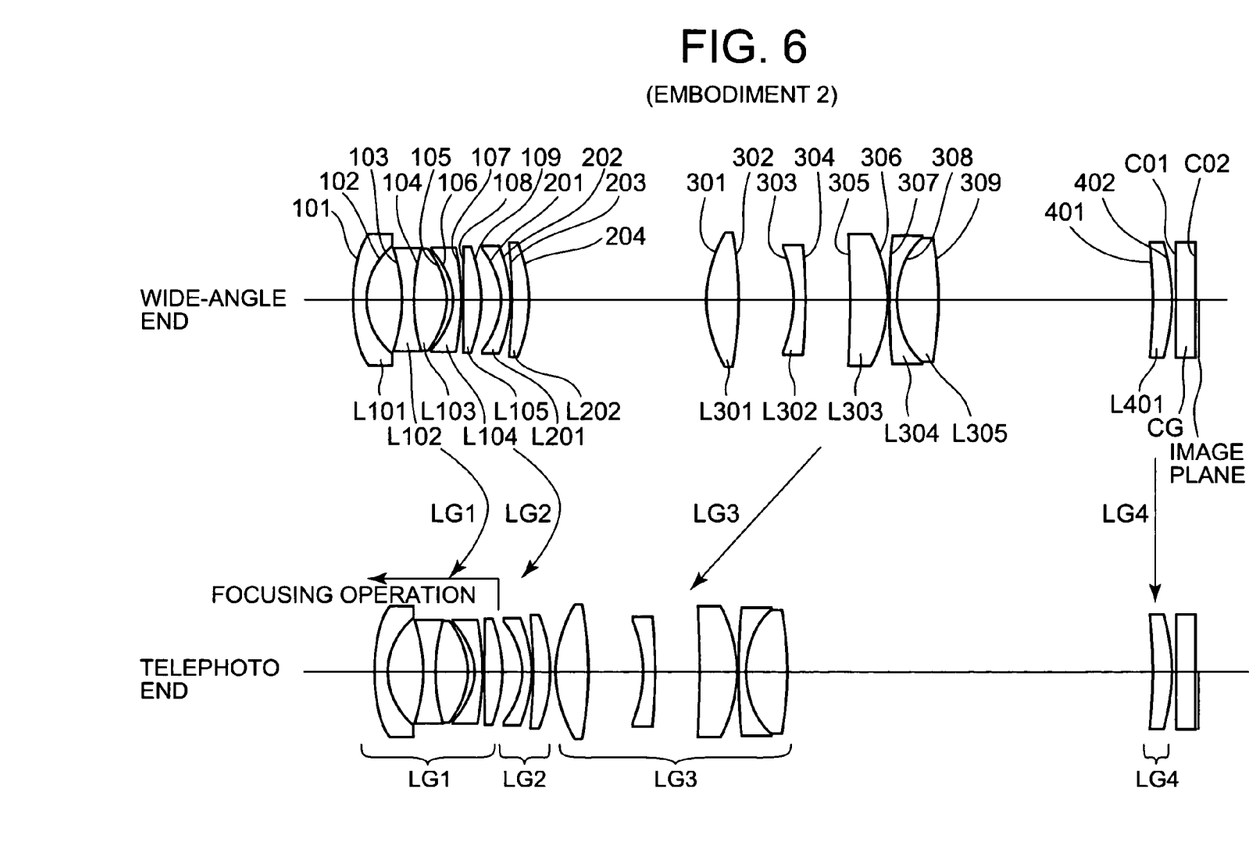
FIG. 6 is a diagram showing a lens configuration of a second embodiment of a zoom lens according to the invention.
Figure 7:
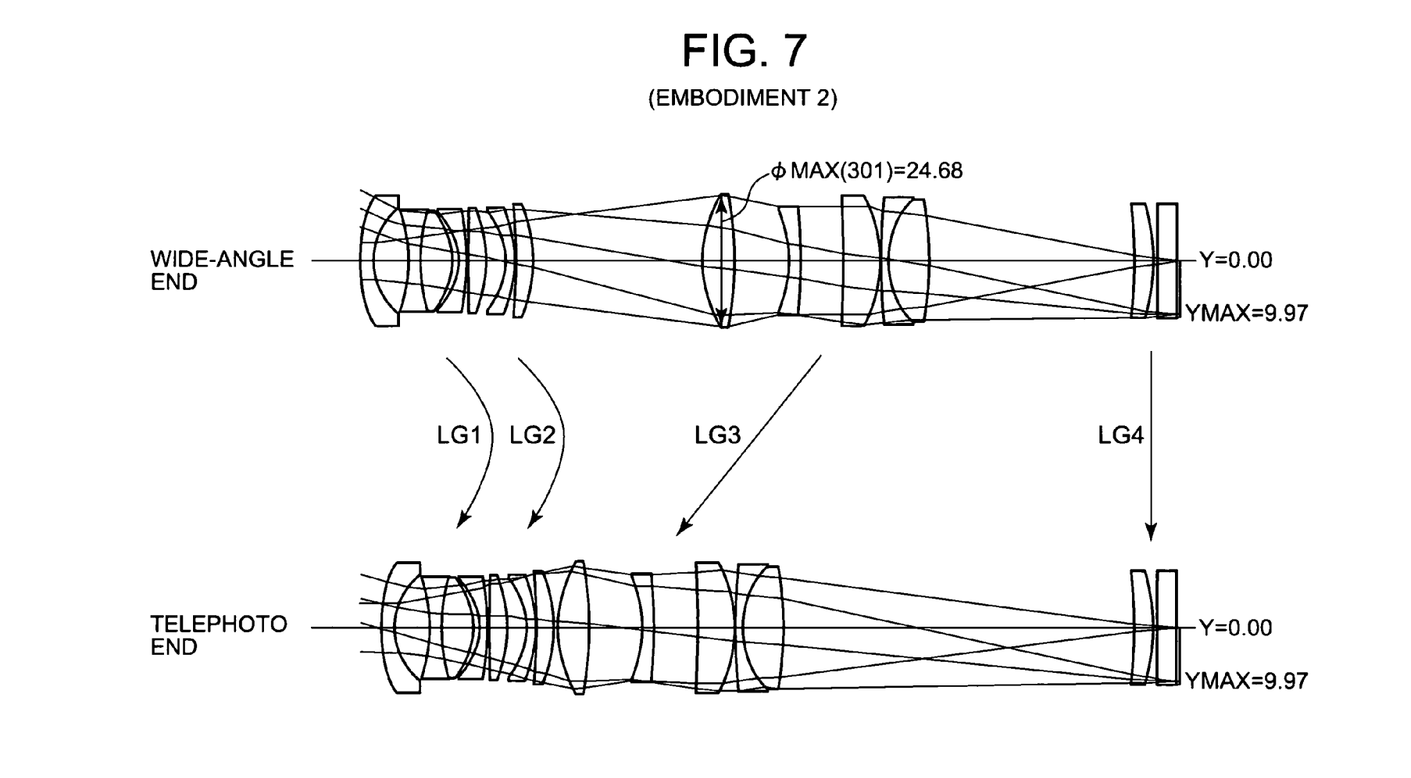
FIG. 7 is a diagram showing optical paths and lens effective apertures of the second embodiment.

A zoom lens of a second embodiment shown in FIGS. 6 and 7 is a compact projection zoom lens which is best suited to an application in which a 0.5-inch DMD image display device shown in FIG. 2 is used. This zoom lens has a maximum effective aperture of 24.68 mm as the projection lens and is made up of, in order from an enlarging size thereof, a first lens group LG1 having a negative refractive power as a whole, a second lens group LG2 having a negative refractive power as a whole, a third lens group LG3 having a positive refractive power as a whole, and a fourth lens group LG4 having a positive refractive power as a whole.

The first lens group LG1 is made up by disposing, in order from an enlarging side thereof, a negative lens element (designated as L101 and having an enlarging side surface 101 and a reducing side surface 102) which is formed into a meniscus shape which is made to bulge outwards from the enlarging side to be convex, a negative lens element (designated: as L102 and having an enlarging side surface 103 and a reducing side surface 104), a positive lens element (designated as L103, having an enlarging side surface 104 and a reducing side surface 105, and cemented to L102), a negative lens element (designated as L104, and having an enlarging side surface 106 and a reducing side surface 107), and a positive lens element (designated as L105, and having an enlarging side surface 108 and a reducing side surface 109).

The second lens group LG2, which follows the first lens, group LG1, is made up by disposing a negative lens element (designated as L201, and having an enlarging side surface 201 and a reducing side surface 202) and a positive lens element (designated as L202, and having an enlarging side surface 202 and a reducing side surface 203).

The third lens group LG3 is made up by disposing a positive lens element (designated as L301, and having an enlarging side surface 301 and a reducing side surface 302), a negative lens element (designated as L302, and having an enlarging size surface 303 and a reducing side surface 304), a positive lens element (designated as L303, and having an enlarging side surface 305 and a reducing side surface 306), a negative lens element (designated as L304, and having an enlarging side surface 307 and a reducing side surface 308), and a positive lens element (designated as L305, having an enlarging side surface 308 and a reducing side surface 309, and cemented to L304).

The fourth lens group LG4 is made up by disposing a single positive lens element (designated as L401, and having an enlarging side surface 401 and a reducing side surface 402). In addition, a cover glass CG (having an enlarging side surface designated as C01 and a reducing side surface as C02), which is a constituent components of a light valve such as a DMD, is provided between a reducing side of the fourth lens group LG4 and a surface of the light valve with a slight airspace provided therebetween.

The fourth lens group LG4 is fixed while the focal length is being changed, the first lens group LG1 and the second lens group LG2 are made to move on an optical axis in a direction from the enlarging side towards the reducing side over a range from a wide angle end to an intermediate range and are made to move on the optical axis in a direction from the reducing side towards the enlarging side over a range from the intermediate range to a telephoto end, and the third lens group LG3 is made to move on the optical axis in a direction from the reducing side to the enlarging side over a range from the wide angle end to the telephoto end, whereby the focal length of the whole lens system of the zoom lens is changed.

Figure 9:
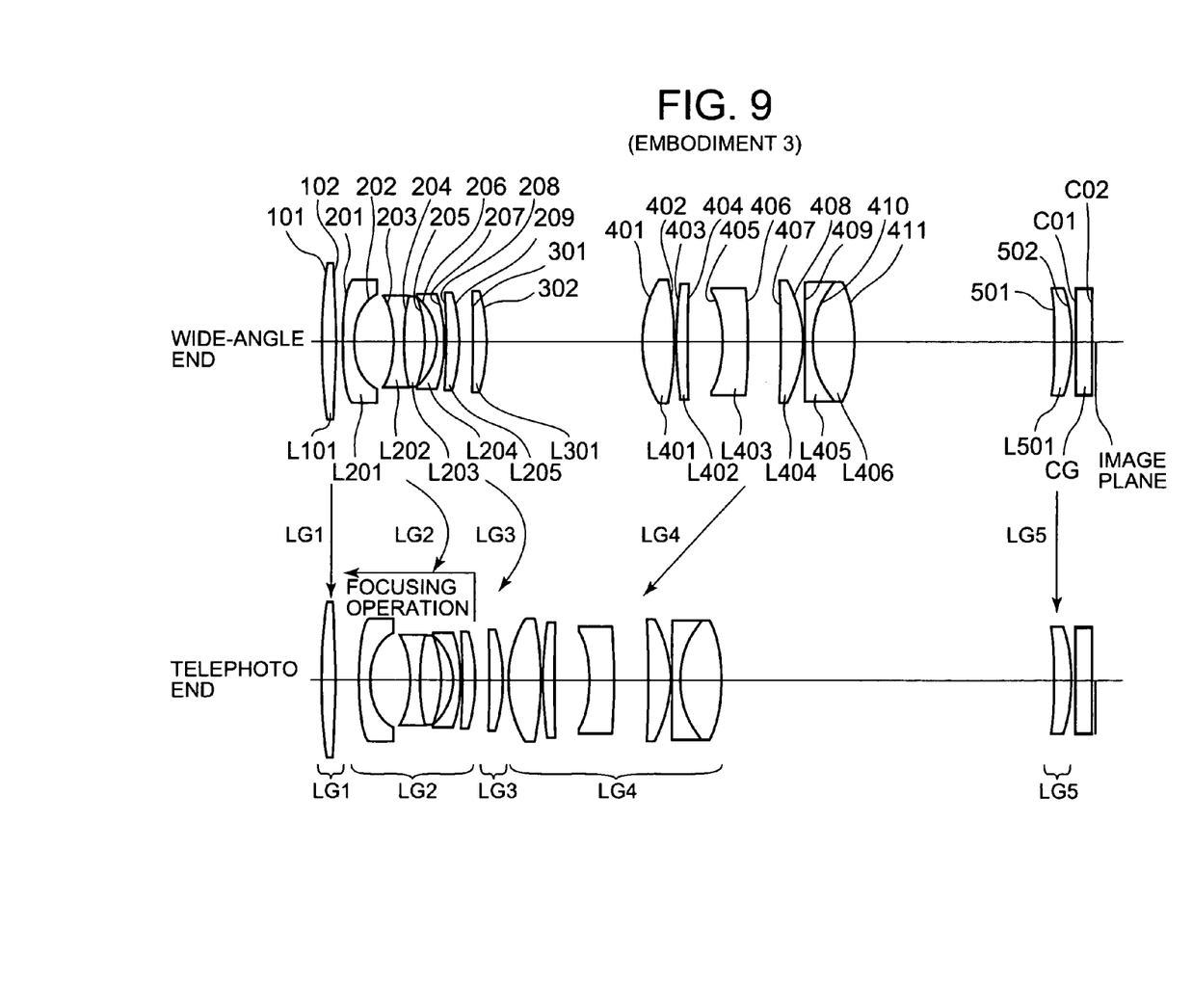
FIG. 9 is a diagram showing a lens configuration of a third embodiment of a zoom lens according to the invention.
Figure 10:
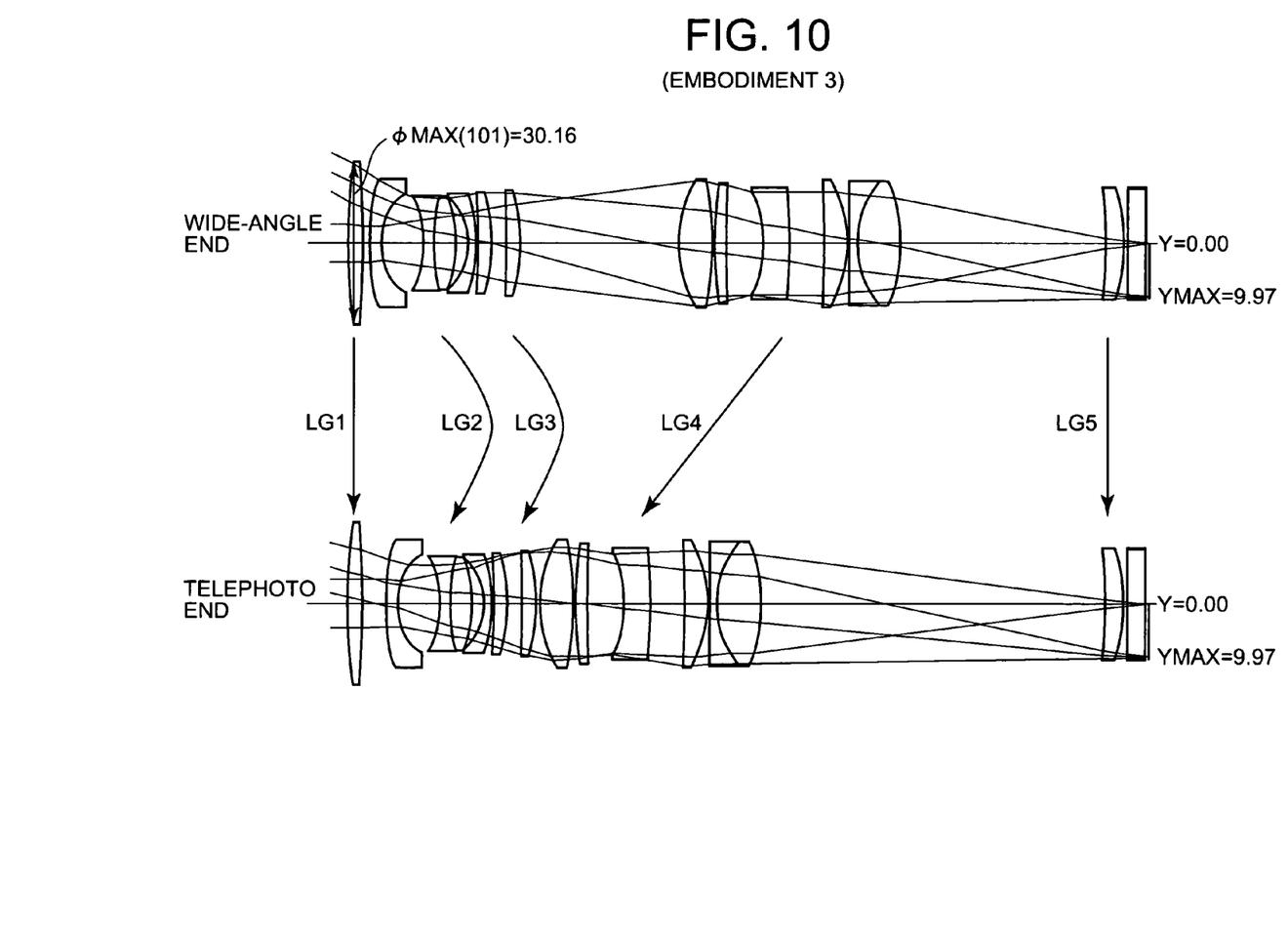
FIG. 10 is a diagram showing optical paths and lens effective apertures of the third embodiment.

A zoom lens of a third embodiment shown in FIGS. 9 and 10 is a compact projection zoom lens which is best suited to an application in which the 0.5-inch DMD image display device shown in FIG. 2 is used. This zoom-lens has a maximum effective aperture of 30.16 mm as the projection lens and is made up of, in order from an enlarging size thereof, a first lens group LG1 having a positive refractive power as a whole, a second lens group LG2 having a negative refractive power as a whole, a third lens group LG3 having a positive or negative refractive power as a whole, a fourth lens group LG4 having a positive refractive power as a whole and a fifth lens group LG5 having a positive refractive power as a whole.

The first lens group, LG1 is made up by disposing a single lens element having a positive refractive power (designated as L101, and having an enlarging side surface 101 and a reducing side surface 102).

The second lens group LG2 is made up by disposing, in order from an enlarging side thereof, a negative lens element (designated as L201 and having an enlarging side surface 201 and a reducing side surface 202) which is formed into a meniscus shape which is made to bulge outwards from the enlarging side to be convex, a negative lens element (designated as L202 and having an enlarging side surface 203 and a reducing side surface 204), a positive lens element (designated as L203, having an enlarging side surface 204 and a reducing side surface 205, and cemented to L202), a negative lens element (designated as L204 and, having an enlarging side surface 206 and a reducing side surface 207), and a positive lens element (designated as L205, and having an enlarging side surface 208 and a reducing side surface 209).

The third lens group LG3 is made up by disposing a single positive lens element (designated as L301, and having an enlarging side surface 301 and a reducing side surface 302).

The fourth lens group LG4 is made up by disposing a positive lens element (designated as L401, and having an enlarging side surface 401 and a reducing side surface 402), a positive lens element (designated as L402, and having an enlarging size surface 403 and a reducing side surface 404), a negative lens element (designated as L403, and having an enlarging side surface 405 and a reducing side surface 406), a positive lens element (designated as L404, and having an enlarging side surface 407 and a reducing side surface 408), and a negative lens element (designated as L405, having an enlarging side surface 409 and a reducing side surface 410) and a positive lens element (designated as L406, having an enlarging side surface 410 and a reducing side 411, and cemented to L405).

The fifth lens group LG5 is made up by disposing a single positive lens element (designated as L501, and having an enlarging side surface 501 and a reducing side surface 502). In addition, a cover glass CG (having an enlarging side surface designated as C01 and a reducing side surface as C02), which is a constituent components of a light valve such as a DMD, is provided between a reducing side of the fifth lens group LG5 and a surface of the light valve with a slight airspace provided therebetween.

The first lens element and the fifth lens group LG5 are fixed while the focal length is being changed, the second lens group LG2 and the third lens group LG3 are made to move on an optical axis in a direction from the enlarging side towards the reducing side over a range from a wide angle end to an intermediate range and are made to move on the optical axis in a direction from the reducing side towards the enlarging side over a range from the intermediate range to a telephoto end, and the fourth lens group LG4 is made to move on the optical axis in a direction from the reducing side to the enlarging-side over a range from the wide angle end to the telephoto end, whereby the focal length of the whole lens system of the zoom lens is changed.

As is well known, the configuration of an aspherical surface which is used in each of the embodiments is defined by a curve plane obtained by rotating about the optical axis a curve given by the following aspherical expression with a Z axis formed in the optical axis direction and a Y axis formed in a direction which intersects the optical axis at right angles:

$$Z=(Y^2/r)/[1+\sqrt{\{1-(1+K)(Y/r)^2\}}]+A\cdot Y^4+B\cdot Y^6+C\cdot Y^8+D\cdot Y^{10}+\ldots$$

where, r: paraxial radius of curvature; K: cone constant; A, B, C, D . . . : higher order aspherical coefficients. Note that in representing the cone constant and higher order aspherical constant in tables, "E and a number following the E" represents a "power of 10." For example, "E-4" means $10^{-4}$, and a numerical value lying directly before this numeric value only has to be multiplied thereby.

Furthermore, the zoom lens of each of the embodiments is a zoom lens including an optical system made up of a plurality of lens elements or a plurality: of lens groups, wherein the following conditional expression (1) is satisfied with respect to a maximum effective aperture and a size of an image circle, and the following conditional expressions (2), (3) are satisfied with respect to an angle of view and brightness, respectively:

$$1.00<\phi L/\phi I<1.60 \quad (1)$$

$$55<BW<70 \quad (2)$$

$$1.8<FN<2.9 \quad (3)$$

where, $\phi L$: maximum effective aperture of a lens system;

$\phi I$: diameter of a minimum-sized circle which encapsulates a whole image display unit on a reducing side image plane about an optical axis;

BW: total angle of view relative to an image point with $\phi I$ (focused to an object distance of 1700 mm from an enlarging side first surface when a focusing operation is available, at a wide-angle end in the case of a zoom lens);

FN: full-aperture F value of a whole lens system (focused to the object distance of 1700 mm from the enlarging side first surface when the focusing operation is available, at a minimum value in the case of the zoom lens).

While the invention is characterized in that the effective aperture of the lens can be decreased, the conditional expression is used to compare the effective aperture of the lens to the image circle as an index. That is, according to the invention, the aperture can be decreased while maintaining the image circle at a required level. Surpassing a lower limit expresses a requirement of further miniaturization and calls for deterioration of off-axis aberrations, and the marginal performance including distortion is deteriorated. In addition, the full-aperture F value is also increased, whereby an angle at which rays of light are taken in is reduced, thereby making it difficult to secure brightness. On the contrary, in the event that an upper limit is surpassed, the effective aperture is increased, and the discrimination between the zoom lens and a normally designed lens with respect to miniaturization becomes impossible, the feature of the optical system of the invention being thereby lost. In addition, an angle of view is raised as what largely affects the effective aperture on the marginal area of a front lens element.

In the zoom lens of the invention, the angle of view is set to fall within a range defined by the conditional expression (2). In the event that a lower limit is surpassed, the application of the zoom lens is limited, and the product value thereof is reduced. On the contrary, in the event that an upper limit is surpassed, it is inevitable that the effective lens aperture is increased or the performance at the marginal area is deteriorated.

The conditional expression (3) is such as to largely affect the effective aperture at a generally central portion of the whole lens system. In recent years, in many cases, a large back focus is required for optical systems, and to meet this requirement, in many cases, the whole lens system is into a retrofocus type. As this occurs, a bundle of rays of light on the optical axis becomes thickest generally at a central portion of the whole lens system. Since the size of the bundle of rays of light is determined by the full-aperture F value, it becomes difficult to modify the size largely. Consequently, in the event that a lower limit is surpassed in the conditional expression (3), although depending on the relationship with the marginal dimensions of the front lens element and other specification values, dimensions in the vicinity of the center of the optical system is normally increased, this doing the damage to the miniaturization. On the contrary, in the event that the F value is such that an upper limit is surpassed, as one of specifications, an insufficient quantity of light becomes an issue, this resulting in a product which lacks power.

In addition, the following conditional expression (4) is preferably satisfied with respect to a dimension from an upper edge portion of an image display area of the image display device to an upper edge portion of a package and the magnitude of the maximum effective aperture of the lens system, and the following conditional expression (5) is preferably satisfied with respect to a marginal lumination or quantity of marginal light ratio:

$$0.90<(\phi L/2)/SP<1.50 \quad (4)$$

$$50<VG<70 \quad (5)$$

where,

SP: difference in dimension between from the center of the image display device to the upper edge portion of the image display area and to the upper end portion of the package;

VG: marginal lumination or quantity of marginal light ratio (focused to the object distance of 1700 mm from the enlarging side first surface when the focusing operation is available, at the wide-angle end in the case of the zoom lens).

Normally, the projection lens is not disposed so that the optical axis of the lens coincides with the center of the image display device. In contrast, in many cases, the projection lens is disposed so that the optical axis of the lens system is disposed in the vicinity of the upper edge portion of the image display area of the image display device. In this case, the difference in dimension between the center of the image display device to the upper edge portion of the image display area and to the upper edge portion of the package has a crucial meaning. In case no influence from other components than those in the projection optical system is taken into consideration, in the event that this value is not surpassed, that is, in the event that the value of the conditional expression (4) is smaller than one, it will be the package that is involved in the thickness of the projector. In addition, in the event that this value is surpassed, that is, in the event that the value of the conditional expression (4) is larger than one, it will be the effective aperture of the lens that is involved in the thickness of the projector. Consequently, even though the influence of a lens barrel is taken into consideration, in the event that a lower limit of the conditional expression (4) is surpassed, there will be provided no effect on the thickness of the projector, and only a deterioration in performance will be called for. On the contrary, in the event that an upper limit of the conditional expression (4) is surpassed, since it becomes difficult to make the projector thinner due to the size of the lens, the specifications of the product need to be reviewed which include the configuration of the product and rearrangement of involved mechanical components thereof.

The conditional expression (5) relates to the marginal lumination or quantity of marginal light ratio. In the projection lens, generally, the marginal lumination ratio is set to be slightly larger, and to make this happen, although depending on the balance with angle of view, the effective aperture of the lens normally needs to be increased in the vicinity of the front lens element and in a position slightly nearer to the image plane. In the event that a lower limit of the conditional expression (5) appears to be surpassed, it does not have to be particularly the lens system of the invention. On the contrary, in the event that an upper limit is surpassed, either the effective aperture will be increased largely, or a deterioration in marginal performance will be called for, and the compatibility with the specifications and performance will become difficult.

Figure 12:
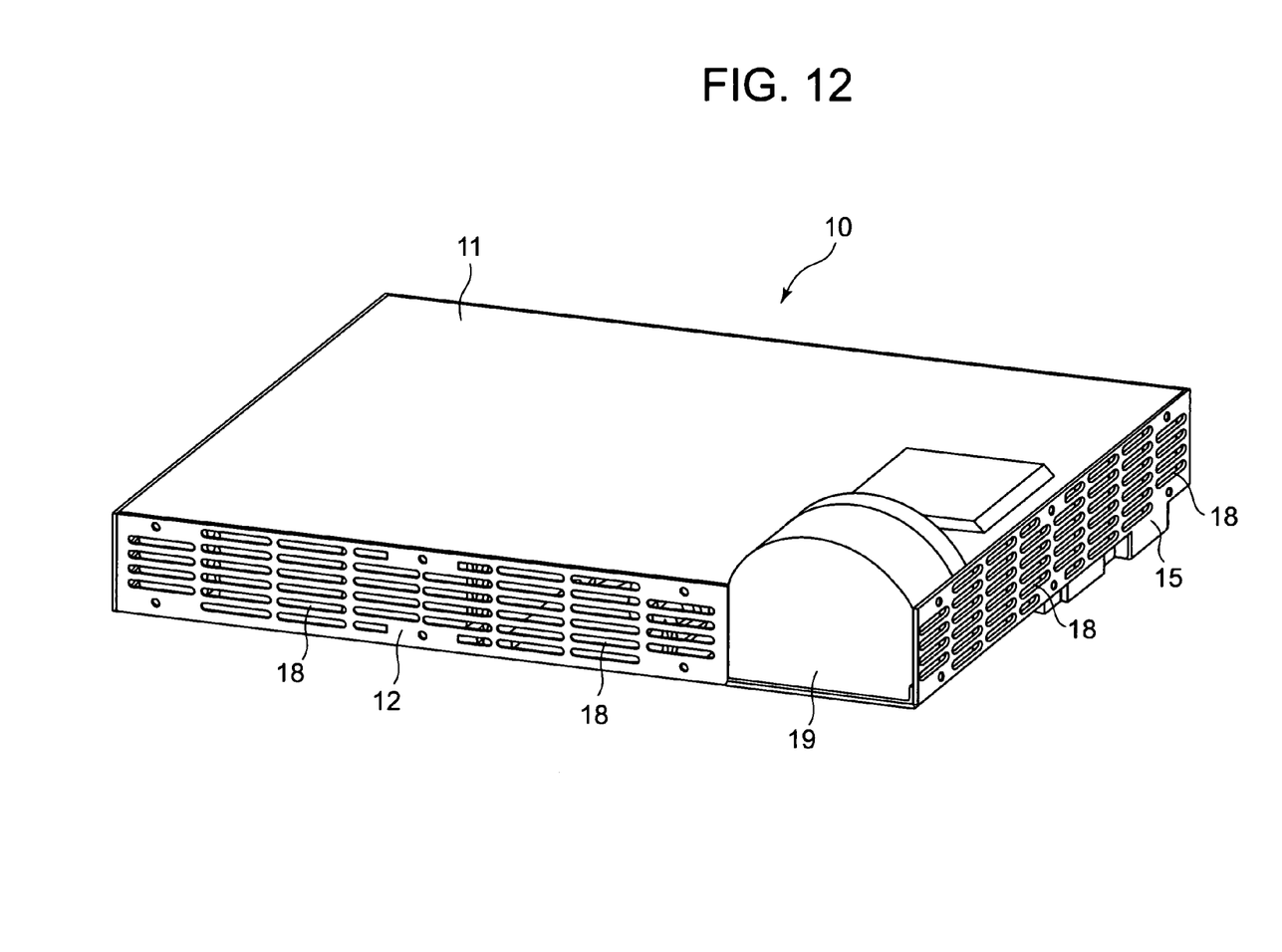
FIG. 12 is an external view of a projector which employs the zoom lens according to the invention.

An external view of a projector to which the zoom lens of the invention is applied is shown in FIG. 12. As is shown in FIG. 12, a projector 10 is formed substantially into a rectangular parallelepiped shape and has a lens cover 19 which covers a projection opening provided to a side of a front panel 12 which makes up a main body case, and a plurality of vent holes 18 are provided in the front panel 12. In addition, although the illustration thereof in FIG. 12 is omitted, a keys/indicators section is provided on an upper panel 11 of the main body case, and provided on this keys/indicators unit are keys and indicators including a power supply switch key and a power indicator which indicates an ON or OFF state of a power supply a lamp switch key which turns on a lamp of a light source device and a lamp indicator which indicates the illumination of the lamp, and an overheat indicator which indicates the overheat of the light source when it actually occurs. Furthermore, on a back side, not shown, of the main body case, an I/O connector ports section where USB terminal ports and image inputting D-SUB terminal, S terminal and RCA terminal ports are provided, a power supply adapter plug port, and an Ir receiving unit which receives signals from a remote controller are provided on a back panel. In addition, a plurality of vent holes 18 are provided, respectively, on a right-hand side panel, not shown, which is a side panel of the main body case and a left-hand side panel 15 which is a side panel shown in FIG. 12, and a projection lens which is made up of the zoom lens that has been described heretofore is accommodated at the rear of the lens cover 19 in such a manner as to extend along an inner side of the left-hand side panel 15.

Respective embodiments of the zoom lens which is installed on this projector will be specifically described below.

In tables and diagrams below, a unit of length dimension is mm unless stated specifically otherwise. In addition, as to symbols in the tables, f denotes a focal length of the whole zoom lens system, $F_{no}$ an F number, and $2\omega$ a total angle of view of the zoom lens. Furthermore, r denotes radius of curvature, d lens thickness or airspace between lens elements, $n_d$ a refractive index relative to the d line, an $v_d$ Abbe number of the d line, Y an image height, and YMAX a maximum image height (where, numerical values in the table which change with focusing operation are numerical values which result when focused to an object distance of 1700 mm from the surface 101). Consequently, the value of the diameter of the image circle double the value of YMAX. In addition, φMAX denotes a maximum value of the diameter of a circle which takes as a radius thereof a dimension from the optical axis to a point on each lens surface where a ray of light is incident or emerges when the ray of light passes through the lens surface, and for example, φMAX (101) denotes a φMAX of the surface 101. CA1, CA2 and CA3 in spherical aberration diagrams of the diagrams showing aberrations are aberration curves in wavelengths of CA1=550.0 nm, CA2=435.8 nm and CA3=640.0 nm, respectively. In addition, S.C. is a sine condition. In aspherical aberration diagrams, S denotes sagital and M denotes meridional. In addition, throughout the tables, unless stated specifically otherwise, a wavelength used in calculating various values is CA1=550. nm.

Embodiment 1

Figure 5:
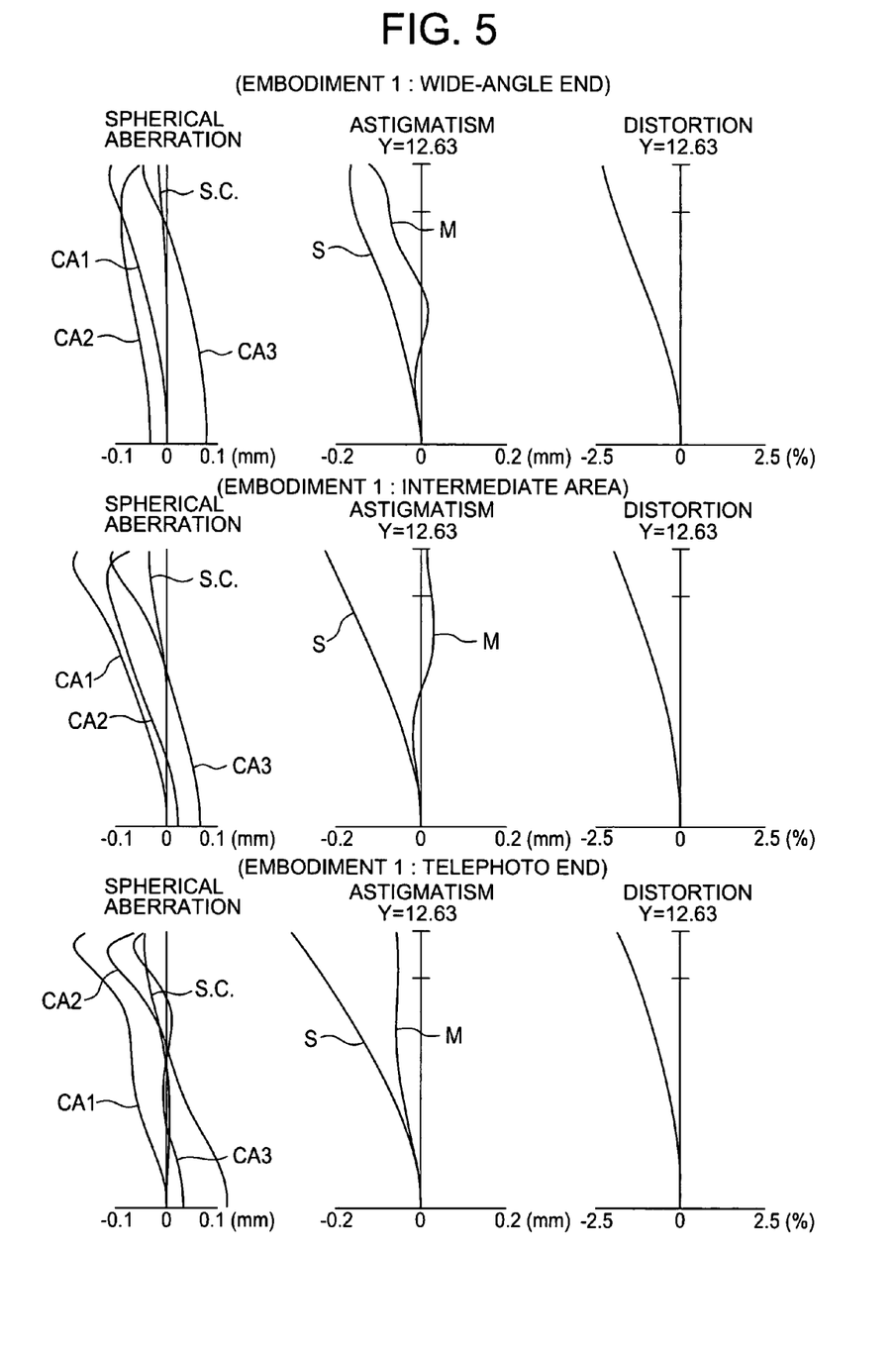
FIG. 5 is a diagram showing aberrations of the first embodiment.

A numeric example for a first embodiment of the zoom lens of the invention will be shown in Table 1. In addition, FIG. 3 shows a lens configuration diagram thereof, FIG. 4 shows a light ray diagram and a lens effective aperture diagram, and FIG. 5 shows aberration diagrams thereof.

TABLE 1

| | Wide angle end | Intermediate area | Telephoto end |
|---|---|---|---|
| f | 20.45 | 28.39 | 39.60 |
| $F_{no}$ | 2.29 | 2.68 | 3.24 |
| $2\omega$ | 64.56 | 48.77 | 36.00 |
| | Hereinafter, airspaces which change by variable power | | |
| D11 | 27.18 | 12.90 | 2.52 |
| D19 | 38.00 | 49.91 | 66.70 |

| Serial numbers | Surface numbers | r | d | $n_d$ | $v_d$ | ΦMAX |
|---|---|---|---|---|---|---|

TABLE 1-continued

| | | | | | | |
|---|---|---|---|---|---|---|
| 1 | 101 | 21.796 | 1.20 | 1.84666 | 23.78 | 29.00 |
| 2 | 102 | 14.729 | 4.06 | — | — | 25.06 |
| 3 | 103 | 63.002 | 3.50 | 1.74330 | 49.30 | 25.00 |
| 4 | 104 | 32.461 | 5.00 | — | — | 21.72 |
| 5 | 105 | −31.302 | 1.29 | 1.71300 | 53.94 | 21.30 |
| 6 | 106 | 49.720 | 10.00 | 1.78472 | 25.72 | 20.84 |
| 7 | 107 | −54.353 | 3.58 | — | — | 20.00 |
| 8 | 108 | −16.129 | 2.00 | 1.67003 | 47.20 | 20.08 |
| 9 | 109 | −38.061 | 0.72 | — | — | 22.50 |
| 10 | 201 | −276.179 | 3.71 | 1.83400 | 37.34 | 23.98 |
| 11 | 202 | −43.234 | [D11] | — | — | 24.96 |
| 12 | 301 | 28.060 | 10.00 | 1.50670 | 70.50 | 28.72 |
| 13 | 302 | −41.292 | 8.40 | — | — | 28.60 |
| 14 | 303 | −126.548 | 3.40 | 1.79950 | 42.34 | 26.68 |
| 15 | 304 | 28.571 | 8.00 | 1.51680 | 64.20 | 26.58 |
| 16 | 305 | −38.428 | 0.61 | — | — | 27.00 |
| 17 | 306 | 166.074 | 2.00 | 1.83400 | 37.34 | 26.90 |
| 18 | 307 | 22.399 | 8.80 | 1.51680 | 64.20 | 26.40 |
| 19 | 308 | −45.004 | [D19] | — | — | 26.90 |
| 20 | 401 | −100.000 | 3.50 | 1.71736 | 29.50 | 26.50 |
| 21 | 402 | −44.000 | 0.70 | — | — | 26.74 |
| 22 | C01 | ∞ | 3.00 | 1.48736 | 64.84 | 25.96 |
| 23 | C02 | ∞ | — | — | — | 25.40 |

Aspherical coefficient

| | 103th surface | | 301th surface |
|---|---|---|---|
| K = | 2.00000E+01 | K = | −1.00000E+00 |
| A = | 5.00621E−05 | A = | −1.59809E−06 |
| B = | 5.21431E−09 | B = | 9.99217E−09 |
| C = | −6.95822E−10 | C = | −2.99692E−11 |
| D = | 4.80824E−12 | D = | 5.22826E−14 |
| E = | −5.22900E−16 | | |

| | 104th surface | | 302th surface |
|---|---|---|---|
| K = | 5.32239E+00 | K = | −1.00000E+00 |
| A = | 2.73787E−05 | A = | 9.37081E−06 |
| B = | 1.15978E−07 | B = | 1.55876E−09 |
| C = | −4.20733E−09 | C = | −3.11400E−11 |
| D = | 3.11199E−11 | D = | 6.43611E−14 |
| E = | −7.35590E−14 | | |

Embodiment 2

Figure 8:
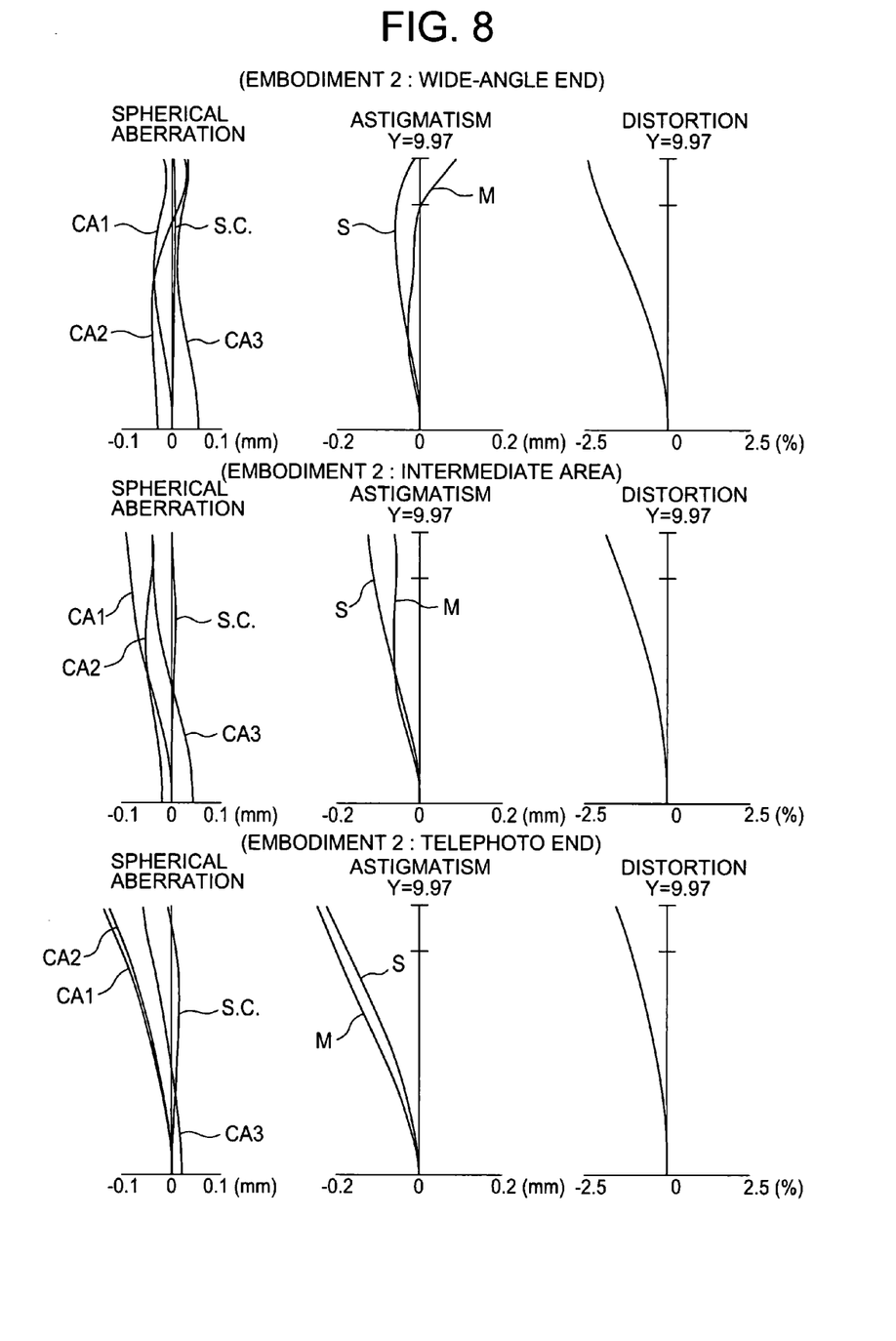
FIG. 8 is a diagram showing aberrations of the second embodiment.

A numeric example for a second embodiment of the zoom lens of the invention will be shown in Table 2. In addition, FIG. 6 shows a lens configuration diagram thereof, FIG. 7 shows a light ray diagram and a lens effective aperture diagram, and FIG. 8 shows aberration diagrams thereof.

TABLE 2

| | Wide angle end | Intermediate area | Telephoto end |
|---|---|---|---|
| f | 15.91 | 22.21 | 30.79 |
| $F_{no}$ | 2.29 | 2.70 | 3.28 |
| 2ω | 65.40 | 49.26 | 36.40 |
| Hereinafter, airspaces which change by variable power | | | |
| D13 | 28.16 | 12.20 | 0.79 |
| D22 | 34.01 | 44.05 | 57.98 |

| Serial numbers | Surface numbers | r | d | $n_d$ | $v_d$ | ΦMAX |
|---|---|---|---|---|---|---|
| 1 | 101 | 57.137 | 2.00 | 1.80139 | 45.45 | 24.00 |
| 2 | 102 | 14.324 | 5.72 | — | — | 19.52 |
| 3 | 103 | −33.506 | 1.92 | 1.80420 | 46.49 | 19.12 |
| 4 | 104 | 41.267 | 5.14 | 1.58144 | 40.89 | 18.58 |
| 5 | 105 | −17.093 | 0.99 | — | — | 18.48 |
| 6 | 106 | −13.995 | 1.40 | 1.80420 | 46.49 | 17.90 |
| 7 | 107 | −49.011 | 0.20 | — | — | 18.94 |
| 8 | 108 | 486.144 | 2.93 | 1.80518 | 25.46 | 19.18 |

TABLE 2-continued

| | | | | | | |
|---|---|---|---|---|---|---|
| 9 | 109 | −30.457 | 3.26 | — | — | 19.28 |
| 10 | 201 | −16.346 | 1.40 | 1.74950 | 35.04 | 18.30 |
| 11 | 202 | −27.672 | 0.20 | — | — | 19.70 |
| 12 | 203 | −180.006 | 2.81 | 1.48749 | 70.45 | 20.48 |
| 13 | 204 | −30.680 | [D13] | — | — | 20.98 |
| 14 | 301 | 27.487 | 5.17 | 1.56907 | 71.30 | 24.68 |
| 15 | 302 | −72.005 | 8.74 | — | — | 24.46 |
| 16 | 303 | −32.214 | 2.00 | 1.80486 | 24.74 | 20.30 |
| 17 | 304 | −69.728 | 7.08 | — | — | 20.42 |
| 18 | 305 | −248.112 | 5.94 | 1.69895 | 30.05 | 23.10 |
| 19 | 306 | −28.665 | 0.20 | — | — | 24.00 |
| 20 | 307 | 162.985 | 1.20 | 1.80610 | 33.27 | 23.30 |
| 21 | 308 | 18.495 | 6.62 | 1.49700 | 81.61 | 22.48 |
| 22 | 309 | −66.141 | [D22] | — | — | 22.64 |
| 23 | 401 | −100.000 | 3.00 | 1.77250 | 49.60 | 20.96 |
| 24 | 402 | −44.000 | 0.66 | — | — | 21.12 |
| 25 | C01 | ∞ | 3.00 | 1.48736 | 64.84 | 20.60 |
| 26 | C02 | ∞ | — | — | — | 20.06 |

Aspherical coefficient

| | 101th surface | | 304th surface |
|---|---|---|---|
| K = | −7.19246E+00 | K = | 0.00000E+00 |
| A = | 4.57553E−05 | A = | 2.08086E−05 |
| B = | −9.29529E−08 | B = | 1.38707E−08 |
| C = | 1.32572E−09 | C = | −1.31164E−11 |
| D = | −8.42886E−12 | | |
| E = | 2.98603E−14 | | |

Embodiment 3

Figure 11:
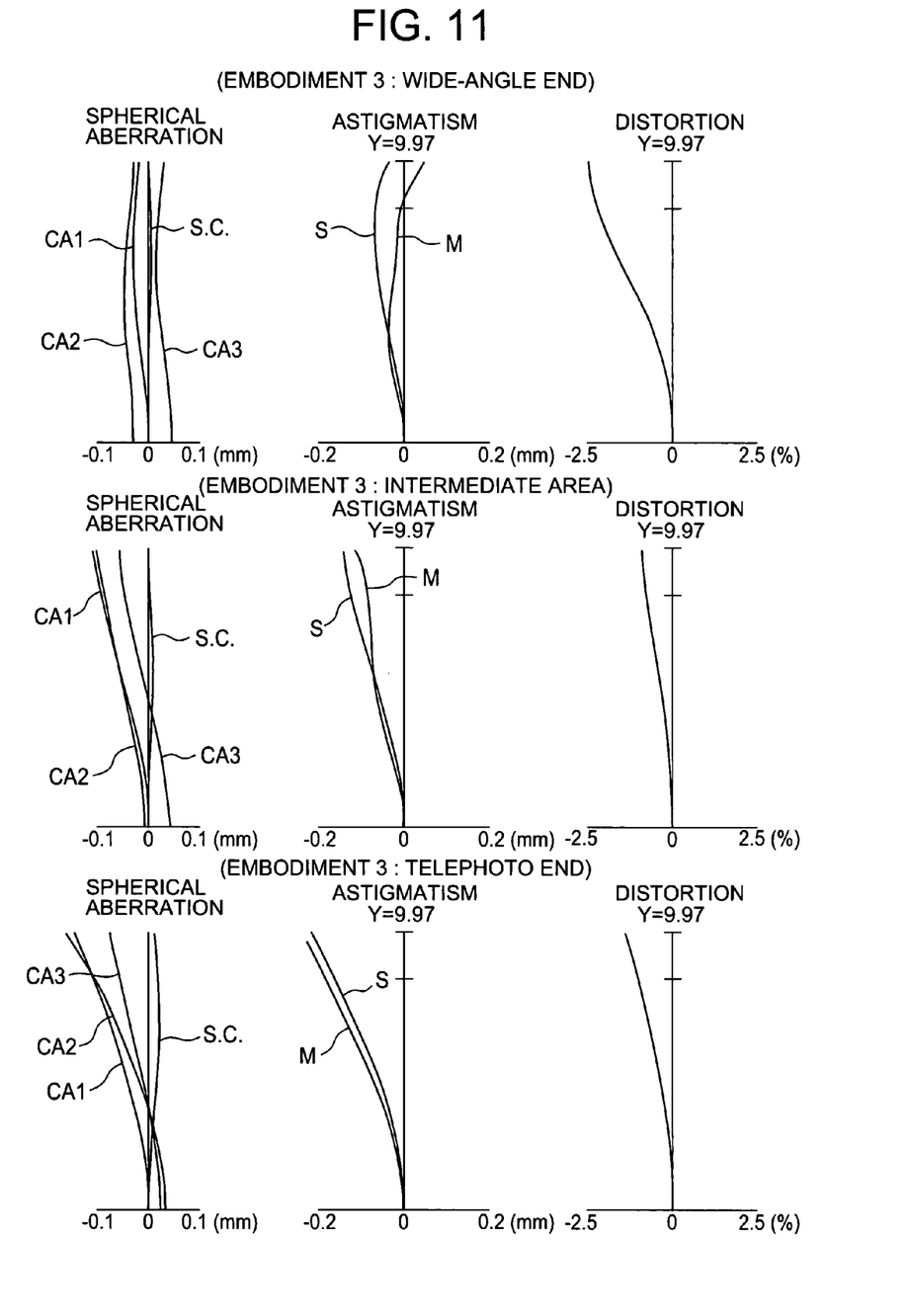
FIG. 11 is a diagram showing aberrations of the third embodiment.

A numeric example for a third embodiment of the zoom lens of the invention will be shown in Table 3. In addition, FIG. 9 shows a lens configuration diagram thereof, FIG. 10 shows a light ray diagram and a lens effective aperture diagram, and FIG. 11 shows aberration diagrams thereof.

TABLE 3

| | Wide angle end | Intermediate area | Telephoto end |
|---|---|---|---|
| f | 15.95 | 22.20 | 30.89 |
| $F_{no}$ | 2.29 | 2.64 | 3.33 |
| 2ω | 65.27 | 48.71 | 36.23 |
| Hereinafter, airspaces which change by variable power | | | |
| D2 | 1.12 | 6.30 | 3.80 |
| D13 | 26.46 | 12.38 | 0.79 |
| D24 | 34.00 | 42.89 | 56.98 |

| Serial numbers | Surface numbers | r | d | $n_d$ | $v_d$ | ΦMAX |
|---|---|---|---|---|---|---|
| 1 | 101 | 132.681 | 2.37 | 1.48749 | 70.45 | 30.16 |
| 2 | 102 | −355.002 | [D2] | — | — | 29.10 |
| 3 | 201 | 84.046 | 2.00 | 1.80610 | 40.73 | 24.04 |
| 4 | 202 | 13.513 | 6.85 | — | — | 18.86 |
| 5 | 203 | −24.731 | 1.75 | 1.67003 | 47.19 | 17.80 |
| 6 | 204 | 43.074 | 3.70 | 1.75520 | 27.53 | 17.40 |
| 7 | 205 | −26.765 | 1.96 | — | — | 17.26 |
| 8 | 206 | −12.984 | 1.40 | 1.80420 | 46.49 | 17.12 |
| 9 | 207 | −32.423 | 0.20 | — | — | 18.44 |
| 10 | 208 | −153.272 | 2.35 | 1.48749 | 70.45 | 18.78 |
| 11 | 209 | −34.180 | 2.37 | — | — | 19.06 |
| 12 | 301 | −233.815 | 2.31 | 1.54814 | 45.82 | 19.20 |
| 13 | 302 | −37.948 | [D13] | — | — | 19.74 |
| 14 | 401 | 25.432 | 5.73 | 1.49700 | 81.61 | 23.80 |
| 15 | 402 | −59.494 | 0.20 | — | — | 23.54 |
| 16 | 403 | 86.344 | 2.00 | 1.48749 | 70.45 | 22.56 |
| 17 | 404 | 400.000 | 5.98 | — | — | 22.00 |
| 18 | 405 | −28.660 | 4.50 | 1.80610 | 40.88 | 19.66 |
| 19 | 406 | −68.645 | 5.73 | — | — | 21.10 |
| 20 | 407 | −270.653 | 3.81 | 1.58144 | 40.89 | 23.42 |
| 21 | 408 | −26.139 | 0.20 | — | — | 23.76 |

TABLE 3-continued

| 22 | 409 | −400.000 | 1.40 | 1.80100 | 34.97 | 23.32 |
| 23 | 410 | 21.248 | 7.02 | 1.49700 | 81.61 | 23.02 |
| 24 | 411 | −35.697 | [D24] | — | — | 23.36 |
| 25 | 501 | −100.000 | 3.00 | 1.77250 | 49.60 | 21.06 |
| 26 | 502 | −44.000 | 0.66 | — | — | 21.20 |
| 27 | C01 | ∞ | 3.00 | 1.48736 | 64.84 | 20.62 |
| 28 | C02 | ∞ | — | — | — | 20.06 |

Aspherical coefficient;

| 201th surface | 406th surface |
|---|---|
| K = −5.06884E−01 | K = 8.41863E+00 |
| A = 3.97182E−05 | A = 2.53863E−05 |
| B = −1.14544E−07 | B = 1.35648E−08 |
| C = 1.25047E−09 | C = −2.05842E−11 |
| D = −7.25095E−12 | |
| E = 2.30540E−14 | |

Next, values corresponding to the conditional expressions (1) to (5) of the first embodiment to the third embodiment will be shown altogether in Table 4 below.

TABLE 4

| | Embodiment 1 | Embodiment 2 | Embodiment 3 |
|---|---|---|---|
| Conditional expression (1) | 1.5 | 1.24 | 1.51 |
| Conditional expression (2) | 64.56 | 65.4 | 65.27 |
| Conditional expression (3) | 2.29 | 2.29 | 2.29 |
| Conditional expression (4) | 1.37 | 1.05 | 1.29 |
| Conditional expression (5) | 64.9 | 58.9 | 61.8 |

As is obvious from Table 4, the values corresponding to the respective conditional expressions of the first embodiment to the third embodiment satisfy the conditional expressions (1) to (5), and as is obvious from aberrations in each of the embodiments, the respective aberrations are properly corrected despite the fact that the effective apertures of the respective lenses are suppressed to small values, which shows that the zoom lens of the invention can be used on a high-performance, thin projector without any problem.

What is claimed is:

1. A zoom lens comprising an optical system made up of a plurality of lens elements or a plurality of lens groups, wherein the following conditional expression (1) is satisfied with respect to a maximum effective aperture and a size of an image circle, and the following conditional expressions (2), (3) are satisfied with respect to an angle of view and brightness, respectively:

$$1.00 < \phi L/\phi I < 1.60 \quad (1)$$

$$55 < BW < 70 \quad (2)$$

$$1.8 < FN < 2.9 \quad (3)$$

where,

φL: maximum effective aperture of a lens system;

φI: diameter of a minimum-sized circle which encapsulates a whole image display unit on a reducing side image plane about an optical axis;

BW: total angle of view relative to an image point with φI, when focused to an object distance of 1700 mm from an enlarging side first surface when a focusing operation is available, and at a wide-angle end in the case of a zoom lens;

FN: full-aperture F value of a whole lens system, when focused to the object distance of 1700 mm from the enlarging side first surface when the focusing operation is available, at a minimum value in the case of the zoom lens.

2. A zoom lens as set forth in claim 1, wherein the following conditional expression (4) is satisfied with respect to a dimension from an upper edge portion of an image display area of the image display device to an upper edge portion of a package and the magnitude of the maximum effective aperture of a lens system thereof, and the following conditional expression (5) is satisfied with respect to a marginal lumination or quantity of marginal light ratio:

$$0.90 < (\phi L/2)/SP < 1.50 \quad (4)$$

$$50 < VG < 70 \quad (5)$$

where,

SP: difference in dimension between from the center of the image display device to the upper edge portion of the image display area and to the upper end portion of the package;

VG: marginal lumination or quantity of marginal light ratio focused to the object distance of 1700 mm from the enlarging side first surface when the focusing operation is available, and at the wide-angle end in the case of the zoom lens.

3. A zoom lens as set forth in claim 1, wherein the focal lens of the zoom lens can be changed as a result of a plurality of lens groups moving in directions along an optical axis thereof.

4. A zoom lens as set forth in claim 2, wherein the focal lens of the zoom lens can be changed as a result of a plurality of lens groups moving in directions along an optical axis thereof.

5. A projector which installs therein a zoom lens as set forth in claim 1.

6. A projector which installs therein a zoom lens as set forth in claim 2.

7. A projector which installs therein a zoom lens as set forth in claim 3.

8. A projector which installs therein a zoom lens as set forth in claim 4.

* * * * *